United States Patent [19]

Conta et al.

[11] Patent Number: 4,595,937

[45] Date of Patent: Jun. 17, 1986

[54] INK JET PRINT HEAD

[75] Inventors: Renatol Conta, Ivrea; Enrico Manini, Camandona, both of Italy

[73] Assignee: Ing. C. Olivetti & C., S.p.A., Ivrea, Italy

[21] Appl. No.: 617,804

[22] Filed: Jun. 6, 1984

[30] Foreign Application Priority Data

Jun. 10, 1983 [IT] Italy .............................. 67640 A/83

[51] Int. Cl.[4] .............................................. G01D 15/18

[52] U.S. Cl. .................................................. 346/140 R

[58] Field of Search ................................ 346/140 PD

[56] References Cited

U.S. PATENT DOCUMENTS

| | | | |
|---|---|---|---|
| 4,275,290 | 6/1981 | Cielo et al. | 346/140 PD X |
| 4,450,457 | 5/1984 | Miyachi et al. | 346/140 PD |
| 4,458,256 | 7/1984 | Shirato et al. | 346/140 PD |

*Primary Examiner*—George H. Miller, Jr.

*Attorney, Agent, or Firm*—Banner, Birch, McKie & Beckett

[57] ABSTRACT

The head is provided for a conductive ink in contact with an electrode (34) and comprises a container (14) having a capillary nozzle (18, 53) and a counterelectrode (54) set into the nozzle that predetermined thickness of ink is in the front part (53) of the nozzle between the meniscus (52) and the inner part of the nozzle wherein a vaporizing current flows between the electrode and the counterelectrode, thereby to expel the said thickness of ink. For that purpose, the container is closed by an insulating plate (30, 31) on which the counterelectrode (54) is disposed, the counterelectrode in turn being covered by a dielectric layer (56). The nozzle is formed by means of a single hole through the plate, the counterelectrode may be of the same thickness as the said thickness of ink, so that the front part of the nozzle is all through the counterelectrode. The dielectric layer may be a first layer covered by a second layer with a hole in the first layer which is larger in diameter than the nozzle, thereby to create a reserve of ink for the frequent dots. For a multi-nozzle head, the nozzles are produced by grooving a portion of the container and then closing over the grooves by an insulating plate bearing the electrodes and the counterelectrodes which are spaced along the axes of the nozzles.

25 Claims, 6 Drawing Figures

INK JET PRINT HEAD

BACKGROUND OF THE INVENTION

The present invention relates to an ink jet print head of the type set forth in the introductory part of claim 1.

Ink jet heads have been proposed, which produce an ink jet from a nozzle, due to instantaneous vaporisation of a portion of ink in the nozzle so as to expel the layer of ink thereon. In one known head, the ink is conductive and submerges a pair of electrodes which are disposed in facing relationship in a common plane that is perpendicular to the nozzle, whereby vaporisation is caused by passing current between the two electrodes through the ink. Such a head suffers from the disadvantage of requiring the nozzle to be of relatively large diameter so that it is not possible to print sufficiently small dots for high-definition printing.

In another known head, a resistive element which is disposed in the nozzle is energised in such a way as to transmit heat to the ink which is disposed around it. This suffers from the disadvantage of the thermal inertia in regard to transmission of the heat, so that the printing rate is relatively low. The head is also complicated to manufacture and suffers from a low level of reliability by virtue of the operating life of the resistance element.

A head has also been proposed, wherein the ink is conductive and in contact with an electrode which is disposed within the container while the counterelectrode is formed by a metal layer on the outside surface of a plate which carries the nozzle. The ink is ejected primarily by the vaporisation produced in a restricted section of the nozzle by the density of electrical current passing through the ink. This head makes it possible to print dots formed by a plurality of droplets which rapidly dry, but it requires the paper to be held very close to the nozzle and at a strictly constant distance therefrom.

SUMMARY OF THE INVENTION

The object of the present invention is to provide an ink jet print head which is simple and economical and which makes it possible to print uniform dots within certain limits in regard to variation in the distance of the nozzle from the print carrier.

The print head according to the invention is characterised in the characterising part of claim 1.

BRIEF DESCRIPTION OF THE DRAWINGS

The invention will be described in more detail, by way of example, with reference to the accompanying drawings.

DESCRIPTION OF THE PREFERRED EMBODIMENTS

Figure 5:
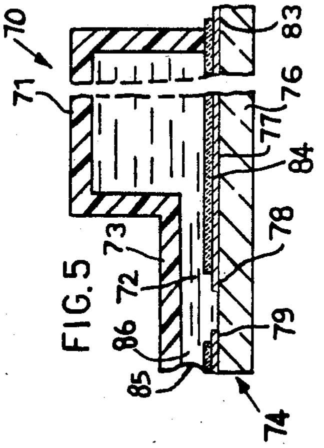
FIG. 5 is a view in longitudinal section of a multi-nozzle head embodying the invention.

Referring to FIG, 1, a platen roller 10 supports a sheet of paper 11 and feeds the paper vertically to permit the printing of dots on successive elementary rows or lines, for example for dot-matrix alphabetic printing. An ink jet print head 12 is substantially of the type described in our published British patent application GB 2 087 314, so that it will be only briefly described herein.

The head 12 is mounted on a carriage 13 which is movable transversely with an alternating movement and essentially comprises a container 14 of insulating material for the ink 16 which is electrically conductive. The container 14 is closed towards the platen roller 10 by a plate 17 in which there is provided a nozzle 18 for expelling the droplets of ink. The carriage 13 is urged towards the platen roller 10 by a spring 19.

The printer comprises an electrical control circuit 21 which is operable to produce an electrical voltage pulse between an electrode in contact with the ink 16 and a counterelectrode which is adjacent to the nozzle 18, as will be seen in greater detail hereinafter, to generate an electrical current in the ink 16 in the nozzle 18, the density of the current being at a maximum in the most restricted section of the nozzle.

The voltage and duration of the pulse are such that vaporisation of a portion of ink is caused in the most restricted section of the nozzle, such vaporisation effect causing particles of ink to be expelled through the nozzle 18 towards the paper 11, substantially as described in our published European patent application EP 0 707 110.

In one embodiment of the invention, the plate 17 (FIG. 2) comprises a base portion 30 of alumina or ceramic material containing 96% to 99% of $Al_2O_3$, the base portion 30 comprising a portion 31 which is between 0.2 and 0.6 mm in thickness. The base portion 30 has a portion 32 which projects downwardly with respect to the container 14.

A layer 33 of conductive material, for example silver-palladium, which is from 10 to 15μ in thickness, is deposited by a thick film process on the surface of the base portion 30 which is towards the container 14. The layer 33 comprises a portion 34 in the form of a ring which is concentric with the axis of the nozzle 18 and a projecting portion 36 which extends downwardly as far as the lower edge of the portion 32 of the base 30.

The diameter of the ring portion 34 is between 0.5 and 1.5 mm and the ring portion 34 forms the electrode in contact with the ink 16 in the container 14. The electrode 34, by means of the projection portion 36, is normally in contact with a spring 35 that is electrically connected to the positive pole of the control circuit 21. Preferably, the internal diameter of the electrode 34 is equal to about 1 mm so as to minimise the path for the current in the mass of ink 16 in the container and to prevent it from remaining uncovered by the ink because of the bubbles of vapour which are formed in the nozzle 18 and which go into the container 14.

A layer 37 of a conductive material, which is not a very noble material, for example silver-palladium, being less than 50μ in thickness, is also applied by a thick film process to the surface of the base portion 30 which faces outwardly. Preferably, the thickness of the layer 37 is between 10 and 15μ so that it can be produced by a single application operation.

The portion 32 of the base portion 30 which is also covered by the layer 37 has a boss 38 which projects towards the paper 11 and is covered by a layer 39 of a wear resistant conductive material, for example chromium or thick-film resistance of the type used for producing potentiometers with a low resistivity value. Preferably, the resistivity value is selected to be not higher than 100 ohm/square, while the thickness of the layer 39 is between 10 and 15μ.

The boss 38 is normally urged by the spring 19 against a transverse paper-pressure bar 41 of electrically conductive material, which is electrically connected to the negative pole of the pilot control circuit 21. The thickness of the bar 41 is such that, together with the boss 38, during the printing operation, it holds the nozzle 18 at a preset spacing of between 0.3 and 0.5 mm from the paper 11.

Concentrically with respect to the nozzle 18 the layer 37 has a hole 42 (see FIG. 2) which has a diameter that is at least fifteen times the diameter of the nozzle 18, preferably between 1 and 2 mm. The layer 37, except for the part which covers the boss 38, is covered by a dielectric layer 43, for example of glass-ceramic material, the thickness of which is at least double the thickness of the metal layer 37, in dependence on the volume of ink with which the counterelectrode is to be in contact. Preferably, the above-mentioned thickness is between 50 and 100μ and it may be produced by two or more application operations by a screen printing process, alternated with firing. The dielectric layer 43 is then covered by an anti-adhesion layer 44, for example of glass, to prevent the particles of ink from adhering to the outside surface of the plate 17. The glass layer 44 may be not more than 20μ in thickness, being preferably about 10μ.

A layer 46 noble, corrosion-resistant metal material such as platinum is then applied to the base portion 30 in the hole 42, in a thickness which is substantially equal to that of the dielectric layer 43 and the glass layer 44. The layer 46 may be produced by two or more screen-printing operations, alternated with firing, or by means of the deposit of molten material.

Figure 2:
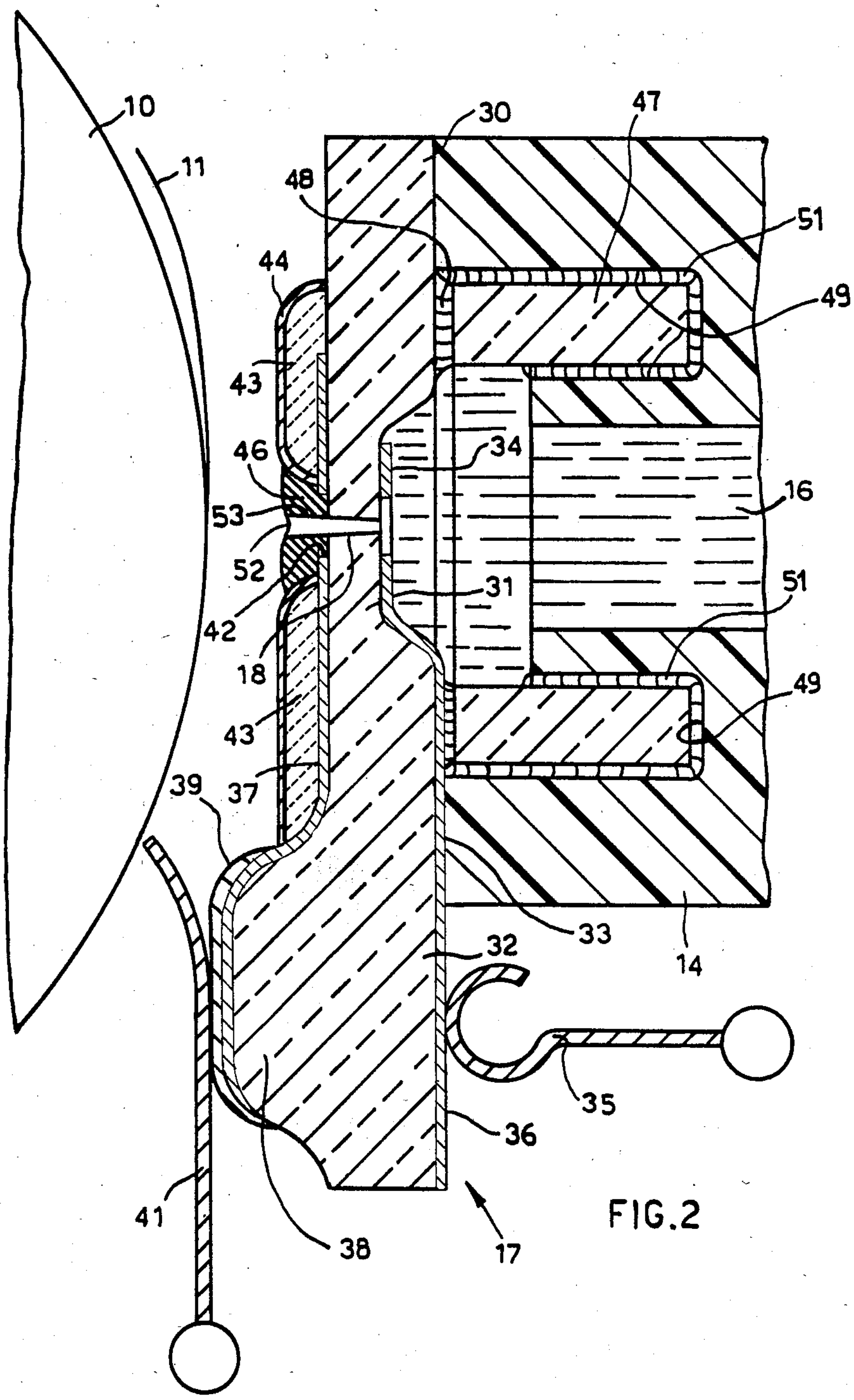
FIG. 2 is a diagrammatic view in cross-section on an enlarged scale of a detail of a first embodiment of a print head according to the invention.

The nozzle 18 is produced by drilling the layers 31 and 46 of the plate 17 in a single operation by means of a laser beam, concentrically with respect to the ring portion 34, and hole 42, in such a way as to produce a minimum section of the nozzle of a diameter between 30 and 60μ. The nozzle 18 then flares slightly in the direction in which the laser beam acts. The nozzle 18 may be produced with a flare in the outward direction, as shown in FIG. 2, if dots of a diameter of 0.2–0.3 mm are to be produced in the printing operation, as is required in high-speed, low-definition printers. Alternatively, the nozzle may be produced with a flare in the inward direction, thereby producing dots of smaller diameter and at a distance from the paper towards the upper limit specified hereinbefore. In either case, the layer 46 constitutes the counterelectrode disposed in the nozzle 18 and axially spaced from the electrode 34.

When the plate 17 has been prepared and drilled as described, a ceramic collar 47 is bonded to the plate 17, substantially concentrically with respect to the nozzle 18, by means of a layer of glass 48. The plate 17 is thus ready to be bonded to the container 14. For that purpose, the container 14 is provided with a circular groove 49 into which the collar 47 is fitted and bonded with polymeric resin 51 to close the container 14 filled with ink 16. The head 12 can now be mounted on the carriage 13 of the printing apparatus.

Normally, by a capillary action, the ink 16 fills the nozzle 18 and forms a meniscus 52 in line with the outside surface of the plate 17, that is to say, the layer 46, as shown in FIG. 2, and the part of the counterelectrode 46 which is disposed facing the electrode 34 is thus covered by a predetermined thickness or volume of ink. The remaining part of the counterelectrode 46 thus forms a front duct 53, with respect to the active part of the counterelectrode, wherein the said volume of ink is disposed.

By energisation of the control circuit 21, a variable voltage pulse is passed between the two electrodes 34 and 46, causing a flow of current in the ink 16 which is between those electrodes, but without substantially influencing either the major part of the ink in the container 14 or the volume of ink disposed in the front duct 53. The flow of current in the ink 16 causes a rise in temperature which is at a maximum in the most restricted section of the nozzle 18. Vaporisation therefore begins in that position, forming a bubble which rapidly expands. The bubble on the one hand expels towards the paper substantially the whole volume of ink in the front duct 53 between it and the meniscus 52, thus printing the dot. On the other hand, the bubble tends to displace part of the ink in the nozzle 18, which is disposed between the bubble and the container 14, towards the container.

The duration of the voltage pulse is calibrated in such a way as to minimise the dimension of the bubble, to permit rapid restoration of the meniscus 52 at the outside edge of the duct 53. Voltage pulses of between 1000 and 3000 V of a duration of between 40 and 60 μs product dots which are very clear and sharp up to a distance of 5 mm, and a meniscus restoration time such as to permit dots to be printed at a frequency of up to 10 KHz.

In accordance with an alternative form of the invention, a layer 54 (see FIG. 3) of noble metal material is applied to the outside surface of the portion 31 of the base portion 30, without leaving the hole 42. A dielectric layer 56 and a glass layer 57 similar to the layers 43 and 44 in FIG. 2 are then applied.

Figure 3:
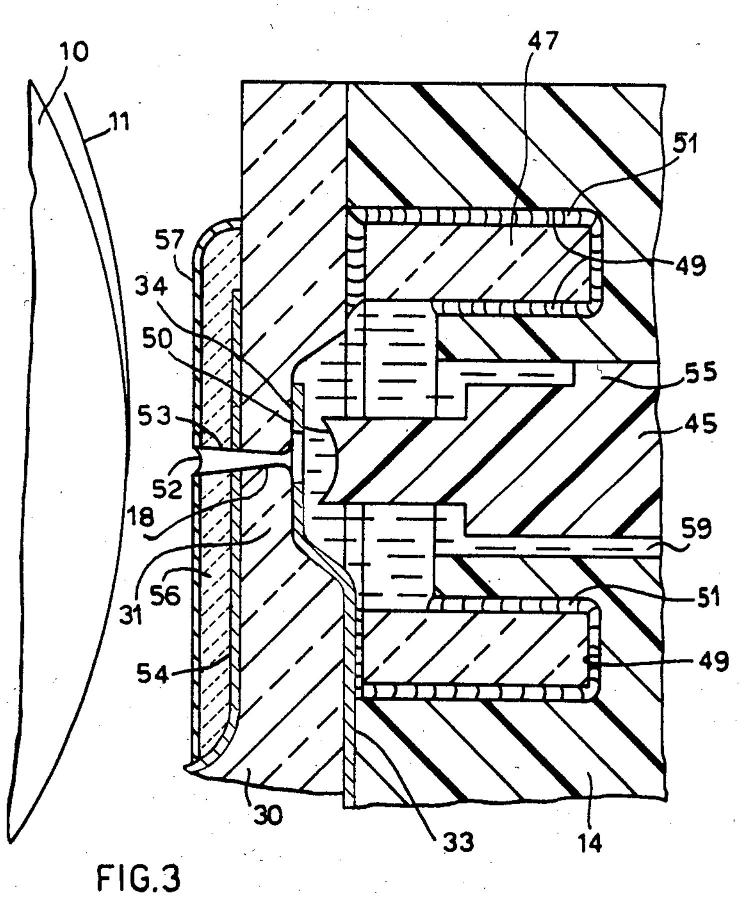
FIGS. 3 and 4 are two views in cross-section of a portion of the detail of FIG. 2, in two alternative forms.

The plate 17 thus prepared is drilled with a laser beam through the layers 31, 54, 56 and 57, in a similar manner to the construction shown in FIG. 2, to produce the nozzle 18, whereby the counterelectrode formed by the layer 54 of noble conductive material and the front duct 53 are very clearly defined. It will be appreciated that it will be necessary to ensure that the drilling operation does not cause excessive burring or smearing of the ceramic material of the layer 31 or the dielectric material of the layer 56, which must not significantly cover the free surface of the counterelectrode 54. In FIG. 3 the nozzle 18 is also shown as being flared in an outward direction.

The current which is generated between the electrode 34 and the counterelectrode 54 will not affect the portion of ink in the nozzle, which is between the container 14 and the counterelectrode 54, while the portion of ink which is in the front duct 53 between the counterelectrode 54 and the meniscus 52 is ejected from the printing operation.

For the purposes of reflecting towards the nozzle 18 the pressure wave caused by vaporisation of the ink, which is directed towards the interior of the container 14, the container is provided inside with a block 45 which terminates with a concave surface 50, preferably of a part-spherical configuration, disposed in front of the nozzle 18 at a spacing of between 0.1 and 1 mm. The block 50 is connected to the internal wall of the container 14 by means of a plurality of webs 55, for example three webs disposed at 120°, of which only one is visible in FIG. 3. The webs 55 therefore leave a gap 59 which permits the region of the nozzle 18 to be supplied with ink.

Figure 4:
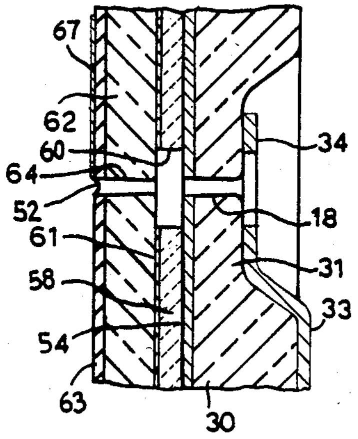

In accordance with another embodiment of the invention, the portion 31 of the base portion 30 (see FIG. 4) is covered by the electrode 34 and the counterelectrode 54 as in the construction shown in FIG. 3. The counterelectrode 54 is now covered by a dielectric layer 58 of glass ceramic material, similar to the layer 43 in FIG. 2, that is to say, provided with a hole 60 which is concentric to the position that the nozzle 18 will occupy. The drilling operation is now effected by means of a laser in the portion 31 of the base portion 30 and the counterelectrode 54. The layer 58 is then covered with a glass bonding layer 61 for connection to a further front layer 62 of ceramic material, which is between 0.2 and 0.5 mm in thickness. The layer 62 is covered by a glass layer 63 to prevent the ink from adhering to the plate 17. The front layer 62 and the layer 63 have a hole 64 which is concentric with respect to the hole 60 and which is of a diameter of between 50 and 150μ, preferably 100μ, constituting the front duct. The hole 64 may be produced by a laser beam or by photo-etching, before bonding the layer 62 to the layer 61.

In this case also, energisation as between the electrode and the counterelectrode causes vaporisation in the nozzle 18, which causes the portion of an ink contained in the front duct 64 to be ejected while the ink contained in the hole 60 is temporarily compressed. When the action of the bubble is terminated, the ink in the hole 60 rapidly restores the meniscus 52 at the outside edge of the duct 64. Therefore, the hole 60 in the layer 58 forms mini-reservoir of ink which permits a substantial increase in the maximum frequency of dot printing.

Finally, an auxiliary electrode 67 may be disposed on the layer 63, which electrode 67 can be energised by a voltage which is higher than the voltage of the pulses in order to eliminate any encrustation of dry ink after a long period of non-operation. Obviously, an auxiliary electrode 67 may also be disposed on the layer 44 in FIG. 2 and on the layer 57 in FIG. 3, for the same purposes of removing encrusted ink.

In accordance with another embodiment of the invention, the print head 70 (see FIGS. 5 and 6) comprises a single container 71 for the ink 16, being provided with a series of nozzles 72 which are parallel to each other and which are aligned in a horizontal row. The container 71 is of photo-etchable ceramic material and comprises a planar portion 73 in which the nozzles 72 are formed beforehand by means of cutting or etching operations, for example by cutting with a grinding wheel or by means of photo-etching, to the desired depth. The nozzles 72 may be of square or rectangular section.

The container 71 is closed by a bottom plate 74 which carries the electrodes and which forms one side of the nozzle 72. In particular, the plate 74 comprises a base portion 76 of ceramic material, which is between 0.3 and 0.6 mm in thickness, to which there is applied a metal layer 77 which is resistant to corrosion, being between 10 and 15μ in thickness.

The layer 47 is subjected to photo-etching so as to form a plurality of electrodes 78 and counterelectrodes 79 (see FIG. 6) which are associated with the nozzles 72. In particular, each electrode 78 is axially aligned with the counterelectrode 79 and is disposed facing the same at a distance of between 50 and 200μ. the counterelectrodes 79 are connected together by means of a transverse portion 81 of the layer 77, which has an end 82 that can be connected to one pole of the control circuit. The electrodes 78 extend over the base 76 with a portion 83 which projects from the container 71 to permit electrical connection of the electrodes 78 to a series of individual poles of the control circuit, which can be energised selectively.

Figure 6:
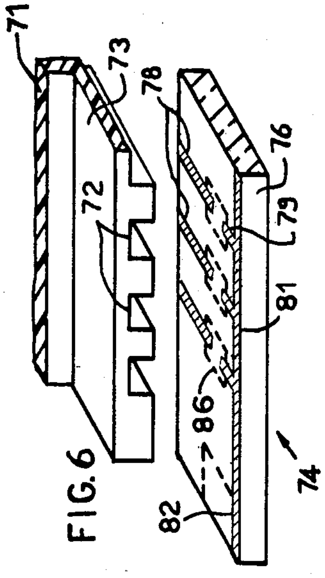
FIG. 6 is a perspective view of part of the head shown in FIG. 5.
Figure 1:
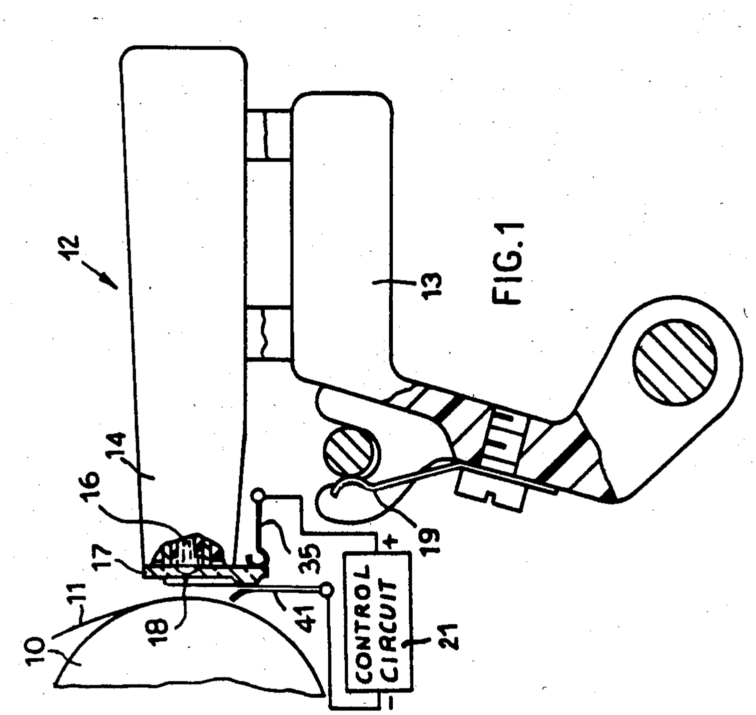
FIG. 1 is a view in cross-section of part of a print head.

The plate 74 is then covered, over the metal layer 77, with a protective glass layer 84 which, for each pair of electrodes 78 and counterelectrodes 79, leaves free an area 86 defined by the broken lines in FIG. 6. That area comprises the facing ends of the pair. Also left free is the end 82 and the ends of the electrodes 78 on the portion 83. When the plate 74 has been prepared in that way, it is finally glass-bonded to the container 71 and filled with ink. The portion of each nozzle 72 from the active end of the counterelectrode 79 to the meniscus 85 constitutes the front duct 86 which contains the volume of ink to be expelled in the form of a droplet.

In this embodiment also, the flow of current between a counterelectrode 79 and the electrode 78 which is energised heats the conductive ink which is present in the section of the nozzle 72 which is between the counterelectrode and the electrode, producing vaporisation which causes the portion of ink to be expelled from the front duct 86. It will be appreciated that the operation of expelling ink may be effected simultaneously in any number of nozzles 72.

Among possible modifications to the embodiments described above, the boss 38 may be made of glass-ceramic material like the layer 37, rather than being sintered together with the base portion 30. In turn, the collar 47 may be produced by sintering together with the base portion 30, rather than subsequently bonded thereto. In addition, the block 45 in the embodiment shown in FIG. 3 may also be provided in the alternative embodiments in FIGS. 2 and 4 and in the embodiment shown in FIGS. 5 and 6. Finally, the counterelectrode in FIGS. 3 and 4 may be formed with an annular portion around the nozzle of noble material and the remainder, acting as a simple conductor, of less noble material.

We claim:

1. An ink jet print head comprising a container (14) for an electrically conductive ink (16) in contact with an electrode (34), wherein the container (14) is closed by a plate (17) comprising a base portion (31) of ceramic material and a metal layer (54) which is less than 50μ in thickness, and wherein the plate is provided with a capillary nozzle (18) formed by a hole which passes through the base portion and the metal layer, which acts as a counterelectrode (46; 54), the ink having such a pressure as to form a meniscus (52) at the outside end of the nozzle, whereby the counterelectrodes is spaced from the said electrode along the axis of the nozzle, the emission of the ink being caused by selectively energizing the electrode with respect to the counterelectrode with voltage pulses so as to cause vaporization of a portion of ink in the nozzle by the effect of the density of current through the ink in a section of the nozzle, characterized in that the plate (17) also comprises a dielectric layer (56; 58; 62) having a capillary hole (53; 54), which forms the front part of the nozzle (18), so that the counterelectrode (46; 54) is set back into the nozzle (18), whereby there is a predetermined thickness of ink (16) in the front part (53; 60; 64) of the nozzle between the meniscus (52) and the said section of the nozzle, whereby the vaporization of ink in this section causes the expulsion of at least part of the ink of the said thickness.

2. A head according to claim 1, characterised in that the counterelectrode (37) comprises a metal material which is not very noble with an annular portion (46) around the nozzle (18) formed by a layer of noble metal material.

3. A head according to claim 1, characterised in that the dielectric layer (43; 56; 58, 62) is covered by a layer (44; 57) of glass which is less than 20μ in thickness, to prevent the ink from adhering to the external surface of the dielectric layer.

4. A head according to claim 1, characterised in that the electrode (34) is produced by deposit of a metal layer on the internal surface of the ceramic base porton (31).

5. A head according to claim 1, characterised in that a collar (47) of ceramic material is bonded to the inward side of the plate (17) and is substantially concentric with the nozzle (18) and is bonded into a complementary seat (49) in the container (14).

6. A head according to claim 1, characterised in that the counterelectrode (46) has a thickness corresponding to the said thickness of ink (16), which contacts the counterelectrode throughout the front part (53) of the nozzle (18).

7. A head according to claim 6, wherein the container (14) is closed by a plate (17) comprising a base portion (31) of ceramic material carrying a metal counterelectrode layer (37) on its front surface, characterised in that the plate (17) also comprises a dielectric layer (43) into which is set an annular counterelectrode portion (46) of the same thickness as the dielectric layer.

8. A head according to claim 7, characterised in that the metal layer (37) is not very noble, whereas the annular portion (46) is of a noble metal.

9. A head according to claim 1, characterised in that the thickness of the dielectric layer (56) is at least double that of the metal layer (54).

10. A head according to claim 9, characterised in that the ceramic base portion (31) is between 0.2 and 0.6 mm in thickness, the metal layer (54) is between 10 and 15μ in thickness, and the dielectric layer (56) is between 50 and 100μ in thickness.

11. A head according to claim 10, characterised in that the nozzle (18) flares slightly from the internal surface of the plate (17) towards the external surface thereof.

12. A head according to claim 10, characterised in that the nozzle (18) flares slightly from the external surface of the plate (17) towards the internal surface thereof.

13. A head according to claim 1, characterised in that the dielectric layer comprises a first, inner layer (58) and a second, outer layer (62).

14. A head according to claim 13, characterised in that the second layer (62) is between 0.1 and 0.2 mm in thickness and has a hole (64) which forms the front part of the nozzle (18) and is between 50 and 150μ in diameter.

15. A head according to claim 13, characterised in that the first layer (58) has a hole (60) which is coaxial with the nozzle (18) and which is of a diameter that is at least fifteen times that of the nozzle, thereby forming a reservoir between the ceramic base portion (31) and the second layer (62) for rapidly reforming the meniscus (52) after each emission.

16. A head according to claim 1, characterised in that the base portion (30, 31) is provided at the front with a projection (38) for bearing against a fixed bar (41) to define the spacing of the nozzle (18) from the print carrier.

17. A head according to claim 16, characterised in that the projection (38) is covered by the metal layer (37) of the counterelectrode, with which it bears against the bar (41) which is connected to one of the poles of a control circuit (21) of the head.

18. A head according to claim 17, characterised in that the ceramic base portion (30, 31) comprises a portion (32) which projects from one side with respect to the container (14), the metal layer (33) of the electrode (34) extending over this portion and being connected to the other pole of the control circuit (21).

19. An ink jet print head comprising a container (70) for an electrically conductive ink (16) in contact with electrode means (78), the container being provided with a series of mutually parallel capillary nozzles (72) at the outside end of each of which a meniscus (85) of the ink is formed, and counterelectrode means (79) spaced from the said electrode along the axis of the nozzle, the emission of the ink being caused by selectively energizing the electrode with respect to the counterelectrode with voltage pulses so as to cause vaporization of a portion of ink in the nozzle by the effect of the density of current through the ink in a section of the nozzle, wherein the container (71) comprises a closure plate (76) forming one side of the nozzle (72), the closure plate comprising a base portion of ceramic material carrying a metal layer which is etched to form a plurality of electrodes (78) and counterelectrodes (79) associated with the nozzles and axially aligned in the nozzles, so that each counterelectrode (79) is contacted by the ink in a portion set back into the nozle (18), whereby there is a predetermined thickness of ink (16) in the front part (86) of the nozzle between each meniscus (85) and the said section of each nozzle, whereby the vaporization of ink in this section causes the expulsion of at least part of the ink of the said thickness.

20. A head according to claim 19, characterised in that the counterelectrodes (79) are connected in a comb-like configuration by means of a transverse portion (81) of the metal layer connected to one pole of the control circuit, the plate (76) comprising a portion over which the electrodes (78) extend outside the container (71), for connection to individual poles of the control circuit.

21. A head according to claim 19, characterised in that the thickness of the metal layer is between 10 and 15μ and in that each electrode (78) and each counterelectrode (79) are disposed in mutually facing relationship at a spacing between 50 and 200μ.

22. A head according to claim 21, characterised in that the plate (76) is covered over the metal layer with a protective glass layer (84) with the exception of a plurality of areas (86) comprising the mutually facing ends of electrodes (78) and counterelectrodes (79).

23. An ink jet print head comprising a container for an electrically conductive ink in contact with an electrode, the container being provided with a capillary nozzle at the outside end of which a meniscus of the ink is formed, and a counterelectrode spaced from the said electrode along the axis of the nozzle, the emission of the ink being caused by selectively energizing the electrode with respect to the counterelectrode with voltage pulses so as to cause vaporization of a portion of ink in the nozzle by the effect of the density of current through the ink in a section of the nozzle, characterized in that the counterelectrode is set back into the nozzle, whereby there is a predetermined thickness of ink in the front part of the nozzle between the meniscus and the said section of the nozzle, whereby the vaporization of ink in this section causes the expulsion of at least part of the ink of the said thickness, and comprising an auxiliary electrode (67) disposed on the outside surface thereof, the auxiliary electrode being capable of being energized by a voltage which is higher than the voltage of the pulses to remove encrustations of dry ink.

24. An ink jet print head comprising a container for an electrically conductive ink in contact with an electrode, the container being provided with a capillary nozzle at the outside end of which a meniscus of the ink is formed, and a counterelectrode spaced from the said electrode along the axis of the nozzle, the emission of the ink being caused by selectively energizing the electrode with respect to the counterelectrode with voltage pulses so as to cause vaporization of a portion of ink in the nozzle by the effect of the density of current through the ink in a section of the nozzle, characterized in that the counterelectrode is set back into the nozzle, whereby there is a predetermined thickness of ink in the front part of the nozzle between the meniscus and the said section of the nozzle, whereby the vaporization of ink in this section causes the expulsion of at least part of the ink of the said thickness, and characterized in that the container comprises an internal body having a concave surface spaced from the inward end of the nozzle by between 0.1 and 1 mm and which is capable of reflecting towards the nozzle the pressure wave which is caused by the vaporization effect.

25. An ink jet print head comprising a container (70) for an electrically conductive ink (16) in contact with an electrode (78), the container being provided with a capillary nozzle (72) at the outside end of which a meniscus (85) of the ink is formed, and a counterelectrode (79) spaced from the said electrode along the axis of the nozzle, the emission of the ink being caused by selectively energizing the electrode with respect to the counterelectrode with voltage pulses so as to cause vaporization of a portion of ink in the nozzle by the effect of the density of current through the ink in a section of the nozzle, characterized in that the counterelectrode (79) is contacted by the ink in a portion set back into the nozzle (18), whereby there is a predetermined thickness of ink (16) in front part (86) of the nozzle between the meniscus (85) and the said section of the nozzle, whereby the vaporization of ink in this section causes the expulsion of at least part of the ink of the said thickness.

* * * * *